United States Patent

Vick

[15] 3,641,812
[45] Feb. 15, 1972

[54] SILICON DIAPHRAGM WITH INTEGRAL BRIDGE TRANSDUCER

[72] Inventor: Gerald L. Vick, La Verne, Calif.
[73] Assignee: Conrac Corporation, New York, N.Y.
[22] Filed: May 20, 1970
[21] Appl. No.: 38,940

[52] U.S. Cl. .................................. 73/88.5 SD, 73/398 AR
[51] Int. Cl. ........................................................ G01l 9/04
[58] Field of Search ............... 73/88.5 SD, 398 R, 88.5, 141; 338/2, 4

[56] References Cited

UNITED STATES PATENTS

| | | | |
|---|---|---|---|
| 3,230,763 | 1/1966 | Frantzis | 73/141 |
| 3,402,609 | 9/1968 | Takewo | 73/398 |
| 3,251,222 | 5/1966 | Fenner | 73/88.5 |
| 3,186,217 | 6/1965 | Pfann | 73/88.5 |
| 3,123,788 | 3/1964 | Pfann et al. | 338/4 |
| 3,292,128 | 12/1966 | Hall | 338/2 |
| 3,049,685 | 8/1962 | Wright | 338/2 |

OTHER PUBLICATIONS

Semiconductor Stress Transducers Pfann J. Applied Physics Oct. 1961 pp. 208-19

Primary Examiner—Richard C. Queisser
Assistant Examiner—John Whalen
Attorney—Charlton M. Lewis

[57] ABSTRACT

A piezoresistive strain gage is produced by forming a pressure-responsive diaphragm from a suitably oriented single crystal of silicon of negative conductivity type and forming one or more complete Wheatstone bridge structures of opposite conductivity type in a diaphragm surface as a compact unitary diffusion pattern comprising two sets of opposite bridge arms extending radially and tangentially, respectively, parallel to respective selected crystal axes, the diffusion pattern including all interconnections between those arms. The unitary nature of such bridge structures reduces inaccuracies of previous structures that were due to thermal and aging effects, and facilitates production of several electrically isolated bridge configurations on a single diaphragm, enhancing potential quality, accuracy and reliability.

7 Claims, 6 Drawing Figures

PATENTED FEB 15 1972   3,641,812

Fig.3 (100) PLANE

Fig.4 (112) PLANE

Fig.5 (110) PLANE

Fig.6 (111) PLANE

INVENTOR.
GERALD L. VICK
BY
Charles M. Lewis

SILICON DIAPHRAGM WITH INTEGRAL BRIDGE TRANSDUCER

This invention has to do with transducers which utilize a diaphragm of crystalline silicon with piezoresistive strain gage elements formed integrally on a face of the diaphragm.

It is common practice to dope the surface layer of a single-crystal silicon diaphragm with suitable impurities to produce local areas in which the conductivity type of the silicon is opposite to that of the main body of the crystal. Four such areas of elongated form may then be connected together by fine wires to form a Wheatstone bridge in which all arms of the bridge contribute to the output signal. All four bridge arms are ordinarily oriented radially on the diaphragm, parallel to the direction of primary stress. The two pairs of opposite bridge arms are then made to respond oppositely to pressure by placing one pair in the central zone of the peripherally clamped diaphragm, where pressure on the opposite diaphragm face produces tensile stress, and the other pair in the peripheral active zone, where pressure produces compressive stress.

U.S. Pat. No. 3,456,226, issued on July 15, 1969 to the present applicant, describes particularly effective crystal orientations and fabrication procedures for insuring availability of optimum bridge elements in both the peripheral and central zones of such prior art pressure transducers.

Although such previously available techniques produce efficient transducers in which all arms of the bridge are composed of the same material and are subject to closely similar thermal environments, the location of different arms of the bridge in different zones of the diaphragm may still lead to temperature differences between them. Thermal gradients in the diaphragm may be caused by power dissipation in the strain gage itself, or by incomplete temperature equilibrium with the surroundings. For example, small shifts in output are difficult to avoid during an appreciable warmup period after power is applied to the transducer.

A further difficulty with previous pressure transducers of the described type results from nonuniform contact resistances and potentials at the electrical contacts by which the various strain gage elements are interconnected to form a bridge. The electrical connections between semiconductors and metals are inherently nonohmic, and the electrical characteristics of such contacts are subject to change with time, temperature and other parameters. The contact requirements for strain gage bridges are unusually exacting, since contact resistances, for example, must typically vary by no more than 1 part in $10^5$ of the strain gage resistance. Also, since each connection utilizes several different metals in the transition from semiconductor to lead wire and each interface forms a temperature-sensitive junction, even small temperature gradients tend to produce thermoelectric potentials that appear as spurious bridge outputs.

The present invention avoids those and other shortcomings of previously available pressure transducers by forming all four arms of the Wheatstone bridge as a compact unitary diffusion pattern which includes all interconnections of those arms. All resistances then see virtually identical environments, and thermoelectric potentials between adjacent arms are greatly reduced. Nonohmic connections between metal and semiconductor occur only in series with the input and output connections between the bridge and the external circuit. If the bridge is powered by a constant current source, and if the output is sensed with a measuring device having infinite effective input impedance, changes in effective resistance at those connections have no effect upon the bridge output.

An article by Pfann and Thurston in the Journal of Applied Physics, vol. 32, pgs. 2008-2019 (1961), describes fundamental relationships between the piezoresistive coefficients and the crystal orientation for several specific silicon structures. That article also suggests the basic concept of forming a complete Wheatstone bridge as a unitary structure. However, Pfann and Thurston do not discuss the problem of pressure measurement, and do not suggest the possibility that a unitary bridge might be feasible under the specialized conditions of a pressure-responsive diaphragm.

That has been accomplished, in accordance with the present invention, by utilizing in combination the known relationship between the radial and tangential stresses in a pressure-responsive diaphragm with clamped edges and the fact that the longitudinal and transverse piezoresistive coefficients have opposite signs in P-type silicon. By suitable selection of the crystal orientation, the invention provides a unitary bridge structure in which the pairs of opposite bridge arms are directed radially and transversely, respectively, and in which the resistance variations in the radial and tangential bridge arms, though both due mainly to the radial stress, are of opposite sign. The contributions to the output signal by both pairs of opposite bridge arms then combine additively, producing an efficient pressure response.

A further feature of the invention results from the fact that the preferred crystal orientations inherently provide a plurality of potential bridge locations which are either strictly or substantially equivalent. By forming a unitary bridge structure at each such location, the invention provides valuable redundancy which may be employed for selection of the most satisfactory single bridge on each diaphragm, for increasing reliability in case of failure, for improving accuracy by interconnection of multiple bridges, and the like.

A full understanding of the invention and of its further objects and advantages will be had from the following description of certain illustrative manners of carrying it out. The particulars of that description, and of the accompanying drawings which form a part of it, are intended only as illustration and not as a limitation upon the scope of the invention, which is defined in the appended claims.

In the drawings:

FIG. 3 is schematic plan representing a diaphragm embodying a preferred form of the invention;

FIG. 4 is a schematic plan representing a modification;

FIG. 5 is a schematic plan representing a further modification; and

FIG. 6 is a schematic plan representing another modification.

Figure 1:
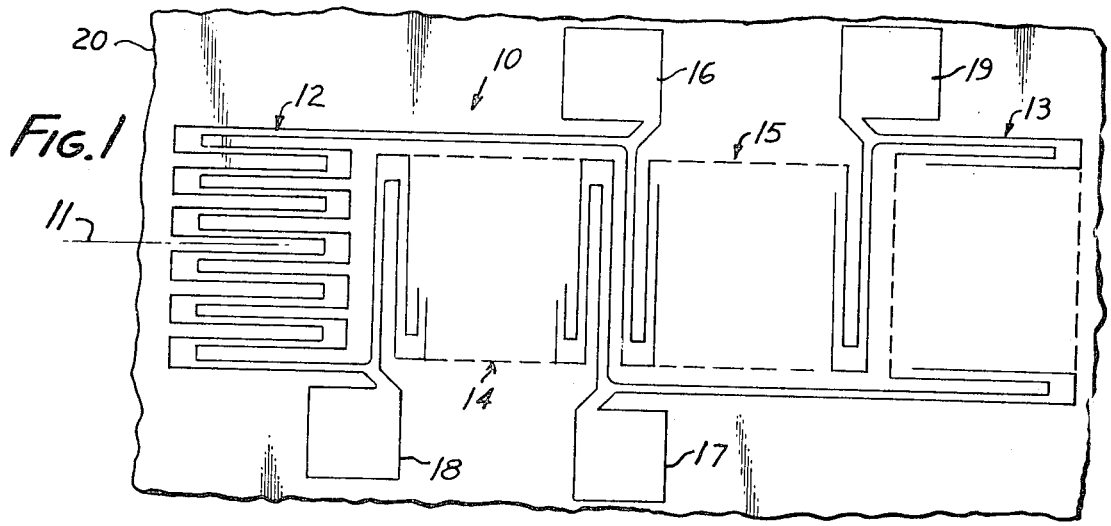
FIG. 1 is a schematic plan representing a unitary bridge structure in accordance with the invention.

An illustrative unitary bridge structure in accordance with the invention is shown in plan in FIG. 1, typically comprising a unitary pattern 10 of P-type silicon produced by controlled diffusion of suitable dopants in the surface of a body 20 of N-type silicon. The pattern has a longitudinal axis 11 which is preferably oriented tangentially on the circular diaphragm, the transverse dimension of the pattern being oriented radially. The pattern includes the two resistance grids 12 and 13 that are then directed predominantly tangentially, and the two radial resistance grids 14 and 15. The grids are interconnected to form a Wheatstone bridge with grids 12 and 13 forming one pair of opposite bridge arms and grids 14 and 15 forming the other. The pattern includes the two pairs of terminal pads 16, 17 and 18, 19 at the bridge corners, to which the input and output leads are connected by conventional technique for supplying power to the bridge and for tapping the output signal from the bridge.

Figure 2:
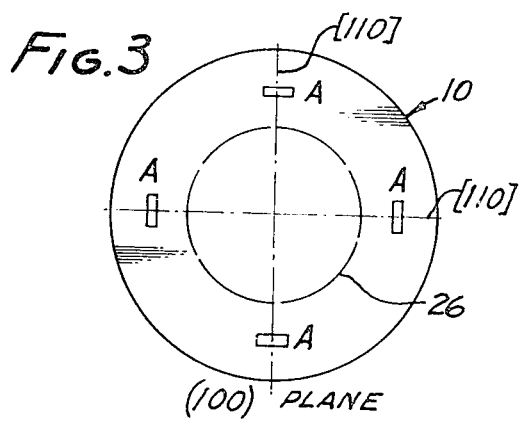
FIG. 2 is a fragmentary axial section representing a mounted diaphragm.
Figure 2:
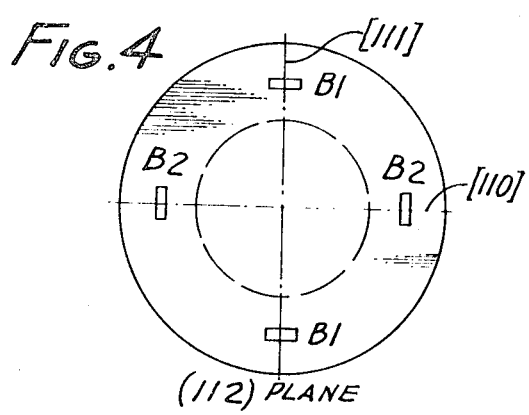
Figure 2:
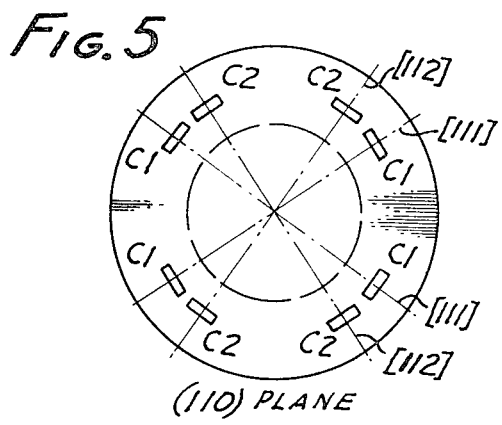
Figure 2:
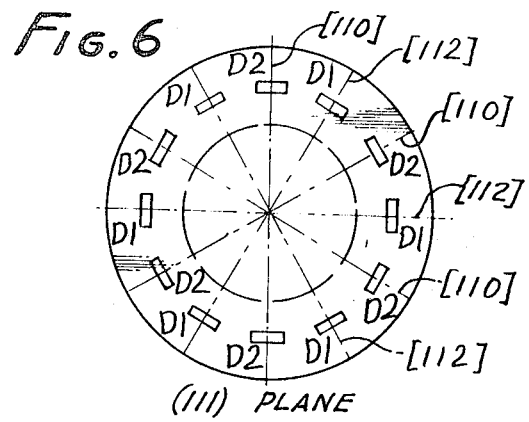
Figure 2:
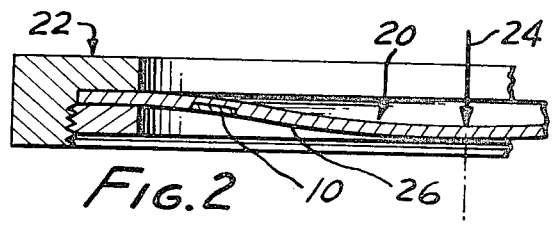

FIG. 2 shows an illustrative structure 22 for rigidly anchoring the periphery of a diaphragm 20 to permit application of a pressure to be sensed to a diaphragm face, as indicated schematically at 24. In practice, structure 22 may be replaced by rigid connection of the diaphragm rim to a stiffening member of any desired type, which may be of silicon formed integrally with the diaphragm. The diaphragm face to which pressure is applied becomes concave within a central zone and convex within a peripheral zone, those zones of opposite stress being separated by a circular locus of zero stress, indicated schematically at 26. Diaphragm deflection in response to pressure application is exaggerated in the drawing for clarity of illustration.

For the peripheral zone of a circular diaphragm clamped at its edge, an applied fluid pressure produces a radial stress $S_r$ and a tangential stress $S_t$, related by the equation $$S_t = PS_r \tag{1}$$

where $P$ is Poisson's ratio. That ratio may be represented as $c/s$, where $s$ is the fractional elongation of a rod due to longitudinal tension and $c$ is the corresponding fractional lateral contraction. The value of $P$ for crystalline silicon is approximately one-third.

The longitudinal current in a silicon strain gage element depends not only upon the stress parallel to the element, but also upon the transverse stress. Shear stresses are absent due to circular symmetry of the diaphragm. The coefficients that determine the dependence of the effective resistance upon longitudinal and transverse stresses are denoted by $\pi_{11}'$ and $\pi_{12}'$, respectively, the primes indicating that the coefficients refer to an arbitrary direction such as that of a particular resistance element under consideration. Corresponding coefficients referred to the crystal axes are written without primes.

The fractional resistance change for a strain gage element oriented radially is given by $$\Delta R_r / R_r = \pi_{11}' S_r + \pi_{12}' S_t \tag{2}$$

and the corresponding expression for a strain gage element oriented tangentially is $$\Delta R_t / R_t = \pi_{11}' S_t + \pi_{12}' S_r \tag{3}$$

The values of the primed coefficients can be computed for any arbitrary direction in terms of the unprimed coefficients and direction cosines for that direction, as described, for example, in the above-identified article by Pfann and Thurston. For silicon of positive conductivity type, with which the present invention is particularly concerned, it is convenient to compute and express $\pi_{11}'$ and $\pi_{12}'$ in terms of the single unprimed shear coefficient $\pi_{44}$, which is by far the largest coefficient for positive silicon, the other unprimed coefficients being effectively negligible by comparison.

A unitary bridge structure of positive silicon with satisfactory sensitivity can be constructed in accordance with the invention for a group of crystal orientations for which the longitudinal piezoresistive coefficients $\pi_{11}'$ for both radial and tangential bridge elements, which are always positive, are equal to at least about $\pi_{44}/2$, and the transverse coefficients $\pi_{12}'$ for both radial and tangential elements, which are always negative, have absolute values at least about one-third of the corresponding longitudinal coefficients $\pi_{11}'$. The upper limit for $\pi_{11}'$ and $\pi_{12}'$ for positive silicon are set inherently by the nature of the material at approximately $2\pi_{44}/3$ and $\pi_{44}/2$ respectively. These values may be derived for example from the formulas in Tables III and IV of the above-identified article by Pfann and Thurston. The resistance change due to radial stress then predominates over that due to tangential stress for the radial bridge elements, and at least balances that due to the tangential stress for the tangential bridge elements.

The accompanying Table shows selected quantities for certain crystal orientations selected for illustration of the invention. The first column lists arbitrary designations for the configurations. The second column shows the crystal plane that is parallel to the plane of the diaphragm. The third and fourth columns show the crystal axes that are parallel to the radial and the tangential directions, respectively, at the unitary bridge structures. The next four columns show values for the indicated coefficients in terms of $\pi_{44}$. Thus, the notation ⅓, for example, is to be read as $\pi_{44}/3$. A negative value means that positive stress causes the resistance to decrease. The last three columns of the Table show the values of $\Delta R/R$, first for the radially directed resistance elements from equation (2), then for the tangentially directed elements from equation (3), and finally as an overall figure of merit for the configuration, the average effective sensitivity for all arms of the bridge.

A preferred crystal orientation, designated A in the Table, places the diaphragm parallel to a (100) crystal plane. Two [110] crystal axes then lie in the plane of the diaphragm and intersect at right angles. Four equivalent bridge structures may be placed in the peripheral zone at those respective axes, as shown schematically at A in FIG. 3. For both the radial and tangential arms of each of those bridges the longitudinal and transverse piezoresistive coefficients $\pi_{11}'$ and $\pi_{12}'$ have the respective values $\pi_{44}/2$ and $-\pi_{44}/2$, as shown in the Table. Equation (2) for the radial arms becomes, using equation (1), $$\begin{aligned}\Delta R_r/R_r &= \pi_{44} S_r/2 - \pi_{44} S_t/2 \\ &= \pi_{44} S_r/2 - \pi_{44} S_r/6 \\ &= \pi_{44} S_r/3\end{aligned} \tag{2a}$$

The corresponding radial sensitivity is shown in the table as ⅓.

Similarly, for the tangential bridge arms, equation (3) reduces to $$\begin{aligned}\Delta R_t/R_t &= \pi_{44} S_t/2 - \pi_{44} S_r/2 \\ &= -\pi_{44} S_r/3\end{aligned} \tag{3a}$$

shown in the table as tangential sensitivity of −⅓.

Since the resistance changes of the radial and tangential bridge arms are of opposite polarity, they contribute additively to the bridge output, yielding the average sensitivity shown as ⅓ in the last column of the Table. And since they are equal in absolute value, the bridge output is essentially a linear function of the applied pressure. A single unitary bridge structure oriented as described in a (100) crystal plane has a sensitivity substantially equal to that of previously available bridges formed by interconnecting separate resistance elements, and provides greatly improved temperature compensation, as described above.

Bridge structures are preferably formed at all four available angular positions at which one [110] crystal axis is radial and another tangential, the radius being greater than the radius of zero stress 26 and being selected to correspond approximately to maximum stress in response to applied pressure. Such positions are indicated schematically at A in FIG. 3. The output circuits from two or more such bridges may then be connected in parallel, producing increased output power as compared to a single bridge. Alternatively, the four completed bridge structures may be tested individually, only the most satisfactory one being selected and employed as active element of the pressure transducer. Such initial redundancy results in greater economy in fabrication and greater average quality of product, as explained in the above-identified patent. Redundant bridges may also be used to produce a plurality of electrically isolated outputs from the same diaphragm, providing increased reliability in case of failure of a lead or component. Such multiple outputs may be used in conjunction with appropriate logic circuitry to enhance accuracy, for example by averaging the outputs or by known techniques of "voting."

Rows B1 and B2 of the Table and FIG. 4 show two unitary bridge configurations that are made available when the diaphragm is cut from the silicon crystal parallel to a (112) crystal plane. That plane contains an [110] axis and an [111] axis intersecting at right angles. A unitary bridge structure can be formed with its radial arms parallel to either of those crystal axes and with its tangential arms parallel to the other. The data in the Table show that the average sensitivity for one of those configurations, B1, is slightly higher,

TABLE

| | Crystal orientation | | | Piezoresistive coefficients relative to $\pi_{11}$ | | | | Sensitivity | | |
|---|---|---|---|---|---|---|---|---|---|---|
| | | | | Radial | | Tangential | | | | |
| | Plane | Radial direction | Tangential direction | $\pi_{11}'$ | $\pi_{12}'$ | $\pi_{11}'$ | $\pi_{12}'$ | Radial | Tangential | Average |
| A | (100) | [110] | [110] | 1/2 | −1/2 | 1/2 | −1/2 | 1/3 | −1/3 | 1/3 |
| B1 | (112) | [111] | [110] | 2/3 | −1/3 | 1/2 | −1/3 | 5/9 | −1/6 | 7/18 |
| B2 | (112) | [110] | [111] | 1/2 | −1/3 | 2/3 | −1/3 | 7/18 | −1/9 | 1/4 |
| C1 | (110) | [111] | [112] | 2/3 | −1/3 | 1/2 | −1/6 | 5/9 | 0 | 5/18 |
| C2 | (110) | [112] | [111] | 1/2 | −1/6 | 2/3 | −1/3 | 4/9 | −1/9 | 5/18 |
| D1 | (111) | [112] | [110] | 1/2 | −1/6 | 1/2 | −1/6 | 4/9 | 0 | 2/9 |
| D2 | (111) | [110] | [112] | 1/2 | −1/6 | 1/2 | −1/6 | 4/9 | 0 | 2/9 | for the other, B2, slightly lower, than for configuration A. The radial and tangential sensitivities for the B configurations have rather different absolute values, making the bridge output less linear with pressure than for configuration A.

When the diaphragm is parallel to a (110) crystal plane, as in rows C1 and C2 of the Table and FIG. 5, two configurations are available. Their average sensitivities are equal, and are comparable to those already discussed. However, in configuration C1 the tangential bridge arms do not contribute directly to the average sensitivity. An advantage of the (110) plane configurations is that eight substantially equivalent bridge positions are made available, due to the presence of two sets of mutually perpendicular [111] and [112] crystal axes.

The two configurations in the (111) plane, shown in lines D1 and D2 of the Table and in FIG. 6 are mutually equal in sensitivity and linearity. Since the (111) plane contains three pairs of mutually perpendicular [110] and [112] axes, each such axis providing two possible bridge locations, a total of 12 virtually equivalent bridge structures can be formed. That capability is a useful supplement to the above-described characteristic of the (100) plane, for which four precisely equivalent positions are available. Though slightly less effective than some of the previously discussed bridge arrangements, the D configurations give responses that are satisfactory for many purposes.

What is claimed is:

1. A pressure transducer comprising in combination
 a pressure-responsive diaphragm formed as a single crystal of silicon of negative conductivity type with the plane of the diaphragm parallel to a selected crystal plane that contains two crystal axes at right angles to each other,
 structure fixedly mounting the diaphragm periphery to permit pressure application to a diaphragm face, and a unitary bridge structure of positive conductivity type formed in the active peripheral zone of one diaphragm face and including one pair of opposite bridge arms extending radially of the diaphragm and parallel to one of said crystal axes, another pair of opposite bridge arms extending tangentially of the diaphragm and parallel to the other of said crystal axes, and terminal areas communicating with the arms for making electrical connections to energize the bridge and to tap an output signal therefrom,
 said crystal plane and axes being so selected that the transverse piezoresistive coefficients for both said pairs of bridge arms have absolute values at least about one-third of the corresponding longitudinal piezoresistive coefficients, and the resistance change due to radial stress in response to applied pressure predominates over that due to tangential stress in the radially extending bridge arms, and at least balances that due to tangential stress in the tangentially extending bridge arms.

2. A pressure transducer as defined in claim 1, and in which said crystal plane is a (100) plane,
 and said crystal axes are both [110] axes,
 the resistance change due to radial stress predominating over that due to tangential stress in both pairs of bridge arms, whereby both pairs of arms contribute additively to the output signal.

3. A pressure transducer as defined in claim 1, and in which said crystal plane is a (112) plane
 and said crystal axes are [111] and [110] axes, respectively,
 the resistance change due to radial stress predominating over that due to tangential stress in both pairs of bridge arms, whereby both pairs of arms contribute additively to the output signal.

4. A pressure transducer as defined in claim 1, and in which said crystal plane is a (110) plane,
 and said crystal axes are [111] and [112] axes, respectively.

5. A pressure transducer as defined in claim 1, and in which said crystal plane is a (111) plane,
 and said crystal axes are [112] and [110] axes, respectively.

6. A pressure transducer as defined in claim 1, and in which said crystal plane and axes are further selected so that the transverse and longitudinal piezoresistive coefficients for each of said bridge arms have substantially equal absolute values, and the resistance change due to radial stress in response to applied pressure predominates over that due to tangential stress in both pairs of opposite bridge arms, producing net resistance changes of opposite polarity and of substantially equal magnitude in those pairs of bridge arms, whereby both pairs of bridge arms contribute additively and substantially equally to the output signal.

7. A pressure transducer as defined in claim 6, and in which said crystal plane is a (100) plane,
 and said crystal axes are both [110] axes.

* * * * *